(12) United States Patent
Yao

(10) Patent No.: US 8,703,222 B2
(45) Date of Patent: Apr. 22, 2014

(54) METHOD FOR MAKING COFFEE BEVERAGE

(75) Inventor: Zhengli Yao, Guangdong (CN)

(73) Assignee: Shenzhen Zofu Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 13/442,887

(22) Filed: Apr. 10, 2012

(65) Prior Publication Data

US 2012/0196014 A1 Aug. 2, 2012

Related U.S. Application Data

(63) Continuation of application No. PCT/CN2010/076912, filed on Sep. 14, 2010.

(30) Foreign Application Priority Data

Oct. 10, 2009 (CN) .......................... 2009 1 0110630

(51) Int. Cl.
 *A23F 5/26* (2006.01)
(52) U.S. Cl.
 USPC .......................................... 426/433
(58) Field of Classification Search
 USPC .............................. 426/433, 594, 388
 See application file for complete search history.

(56) References Cited

U.S. PATENT DOCUMENTS

| | | | | |
|---|---|---|---|---|
| 2,802,739 A * | 8/1957 | Nutting | .......................... | 426/386 |
| 3,421,901 A * | 1/1969 | Migdol et al. | ................ | 426/387 |
| 3,801,716 A * | 4/1974 | Mahlmann et al. | ........... | 426/466 |
| 5,225,223 A * | 7/1993 | Vitzthum et al. | ............. | 426/386 |
| 7,770,511 B2 * | 8/2010 | Yao | .................................. | 99/293 |
| 7,976,887 B2 * | 7/2011 | Inoue et al. | .................... | 426/594 |
| 2007/0003683 A1 * | 1/2007 | Inoue et al. | .................... | 426/594 |
| 2009/0130283 A1 * | 5/2009 | Shinkawa et al. | ............. | 426/541 |

FOREIGN PATENT DOCUMENTS

| | | |
|---|---|---|
| CN | 1064195 A | 9/1992 |
| CN | 1515339 A | 7/2004 |
| CN | 1859853 A | 11/2006 |
| CN | 101103879 A | 1/2008 |
| CN | 101130146 A | 2/2008 |
| CN | 101321468 A | 12/2008 |
| WO | WO2008148281 | * 12/2008 |

OTHER PUBLICATIONS

Derwent Abstract for CN101103879 published Jan. 2008.*

* cited by examiner

*Primary Examiner* — Anthony Weier
(74) *Attorney, Agent, or Firm* — Winston Hsu; Scott Margo

(57) ABSTRACT

A method and a device for making a coffee beverage are provided. The method includes: heating coffee powder by water vapor at a temperature lower than a sublimation temperature of caffeine to sublimate a volatile fat component in the coffee powder without sublimating the caffeine, and dissolving other water-soluble components in water at a temperature lower than 85° C. while only dissolving a little of the caffeine.

4 Claims, 2 Drawing Sheets

METHOD FOR MAKING COFFEE BEVERAGE

CROSS REFERENCE TO RELATED APPLICATIONS

This application is a continuation of PCT/CN2010/076912, filed on Sep. 14, 2010. The contents of PCT/CN2010/076912 are all hereby incorporated by reference.

BACKGROUND OF THE INVENTION

1. Field of the Invention

The present invention relates to a method and a device for making a coffee beverage of a high grade and low caffeine.

2. Related Arts

Coffee is known as the premier beverage around the world, has strong culture, and is one of indispensable beverages in people's social activities, such as relaxation, business talks, or meeting friends. Although various methods for making a coffee beverage exist, a rich aroma and acid, bitter, astringency, and sweet of the coffee are burned into the memories.

In a cup of high-grade coffee beverage, a main source of the aroma is volatile fat in the coffee. Conventional methods for making a coffee beverage include a hot water filtering method, a cooking method, and a high pressure filtering method. The main purpose of the methods is to extract as many aromas in the coffee as possible. The aroma in the coffee comes from volatile fat in coffee beans. In order to obtain the fat, people have to adjust a water temperature in making the coffee beverage, so as to adapt to extraction of the volatile fat of the coffee. However, a high water temperature enables a part of the volatile fat to volatilize and not to be effectively used, and an excessively high water temperature enables the coffee to be over-extracted, so that the coffee tastes different. Therefore, how to select a water temperature and a pressure is always a puzzle in making the coffee. A volatile component and a water-soluble component are extracted by a single method, so the relationship between the both components needs to be balanced, and the extraction of the volatile component and the water-soluble component needs to be traded off for each other. In this way, a balance result is generally as follows. Since partial components in the coffee generate an abnormal taste, in the conventional method, excessively high temperature and excessively much time are generally rejected to prevent over-extraction and generation of the abnormal taste. Therefore, extraction of the fat mainly contributing to the aroma of the coffee is affected.

In another aspect, a big contradiction between the chase for health and drinking of the coffee exists for modern people. The harm of caffeine in the coffee to health is gradually known by people. As published by the world health organization, a maximum intake of the caffeine cannot exceed 300 mg per day and per adult. However, a person drinks 3 to 4 cups of coffee each day, and the normal content of the caffeine in each cup of coffee beverage is generally 100 to 150 mg, so the daily intake reaches more than 400 mg or even is up to twice a secure amount.

To this end, for health, people process the coffee beans and remove the caffeine in the beans through different methods. However, in the removing process, some components having other tastes and aroma in the coffee are unavoidably removed, so that the quality of the coffee is decreased. Nowadays, the coffee culture is very abundant, so this kind of coffee bean cannot satisfy the requirements of the consumers.

SUMMARY OF THE INVENTION

The objective of the present invention is to not only effectively extract volatile fat and a water-soluble component capable of bringing a coffee aroma to achieve a high grade, but also greatly reduce the content of caffeine in a coffee beverage to achieve the purpose of low caffeine.

To this end, the present invention provides a method for making a coffee beverage, wherein the method includes at least one sublimation process and at least one dissolving process. In the sublimation process, coffee powder is heated by water vapor at a temperature lower than a sublimation temperature of caffeine to sublimate at least one part of substances in the coffee powder, so as to extract a part of volatile components in the coffee powder to form mixed vapor. In the absorbing process, the mixed vapor is melted in water, to form a solution containing the volatile components. In the dissolving process, the coffee powder is soaked in water at a temperature lower than 85° C., to dissolve low-temperature water-soluble components in the coffee powder.

Preferably:

In the sublimation process, the temperature is lower than 178° C.

In the dissolving process, a soaking time is 10 seconds to 200 seconds and a soaking temperature is between 32° C. and 85° C.

The sublimation process is first performed, then the dissolving process is performed, then vapor is used to discharge a soaked coffee solution and sublimate the coffee powder once again so as to extract remaining volatile fat components, and heat the discharged coffee solution, and a temperature of the coffee solution is between 67° C. and 85° C.

The time for the sublimation process is controlled to be less than 300 seconds.

The present invention further provides a device for making a coffee beverage, where the device includes a coffee powder container and a coffee beverage container and further includes a vapor generator. The vapor generator communicates with the coffee powder container through a pipeline or a valve, and a water pipe is connected between the coffee powder container and the coffee beverage container.

Preferably:

The device further includes a pump, connected onto the water pipe between the coffee powder container and the coffee beverage container and used for sucking water in the coffee beverage container into the coffee powder container.

The device further includes a first one-way valve and a second one-way valve. The two one-way valves are connected between a bottom of the coffee powder container and the coffee beverage container in opposite directions respectively.

The device further includes a first electromagnetic valve and a second electromagnetic valve, used to: generate a negative pressure in the coffee powder container when a dissolving process is required to be performed, so as to discharge water from the coffee beverage container into the coffee powder container; and generate a high pressure in the coffee powder container or enable the coffee powder container to communicate with an atmosphere after the dissolving is completed, so as to discharge the made coffee beverage from the coffee powder container into the coffee beverage container.

In the present invention, according to the characteristic that the caffeine changes with the temperature and the characteristic that the sublimation temperature of the caffeine is higher than that of the volatile fat in the coffee, the coffee beverage is made by dividing components. The coffee powder is heated by the water vapor at the temperature lower than the sublimation temperature of the caffeine to sublimate the volatile fat in the coffee powder without sublimating the caffeine, and other water-soluble components are dissolved in water at a temperature lower than a quick dissolving temperature of the caffeine while the caffeine only dissolves a little. In this way, the content of the caffeine in the coffee beverage can be greatly reduced and meanwhile the aroma of the coffee is retained, thereby achieving the objective of reducing the content of the caffeine without changing the aroma.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
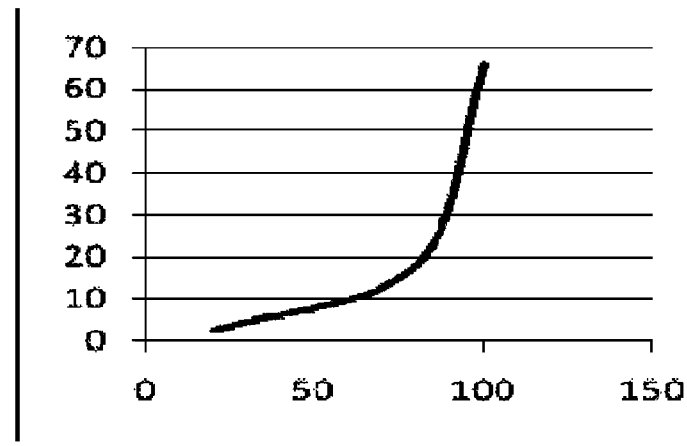
FIG. 1 is a schematic curve graph of caffeine solubility.

In the present invention, substances in coffee are extracted according to components respectively, where a part of the substances is extracted through a sublimation method, and a part of the substances is extracted through a dissolving method. In order to understand the principle, a relationship between a dissolving speed and a dissolving amount of caffeine in coffee and a water temperature is described in FIG. 1. As shown in FIG. 1, the X-axis indicates the water temperature and the Y-axis indicates the solubility. It can be seen from the curve that, when the water temperature reaches 60° C., the dissolving begins to be accelerated, and when the water temperature is above 85° C., quick dissolving occurs. In addition, the present invention also uses the characteristic that a sublimation temperature of caffeine being 178° C. is far higher than a volatilization temperature of volatile fat in the coffee.

Accordingly, in a dissolving process, low-temperature water should be used for dissolving to extract acid, bitter, astringency, and sweet of the coffee. The low-temperature water should be water at a temperature lower than 85° C. The lower the water temperature, the less the dissolved caffeine is. The caffeine is not sensitive to a dissolving time, that is, when the dissolving time is long, the dissolving amount of the caffeine is not obviously increased. Therefore, prolongation of the dissolving time can ensure that other dissolved components are dissolved more fully.

When sublimation is used to extract the volatile fat in the coffee, since the sublimation temperature of the caffeine is 178° C., the caffeine is not extracted (only a small amount of caffeine is extracted) as long as a temperature does not exceed 178° C. during sublimation. However, the volatile fat in the coffee is sublimated with the increase of the temperature and is directly melted into vapor to generate mixed vapor, and the mixed vapor is directly melted into a coffee beverage, thereby solving the puzzle of insufficient aroma in the coffee beverage caused by soaking the coffee in the low-temperature water. Therefore, the coffee beverage is made at a low temperature, and meanwhile, the aroma and taste of the coffee beverage are ensured.

During making, the sublimation may be performed first and then the soaking is performed, or the soaking may be performed first and then the sublimation is performed, or separate sublimation is performed (that is, the sublimation is performed before and after the soaking), or separate soaking is performed. In any case, as long as the soaking is performed at a temperature of 32 to 85° C., the coffee with different low caffeine contents can be obtained.

For the taste, the made coffee beverage is heated to a suitable temperature (generally 67 to 85° C.) through heat of the vapor, the soaking time is 10 seconds to 200 seconds, and the sublimation time is preferably controlled to be less than 300 seconds.

Embodiment 1

Figure 2:
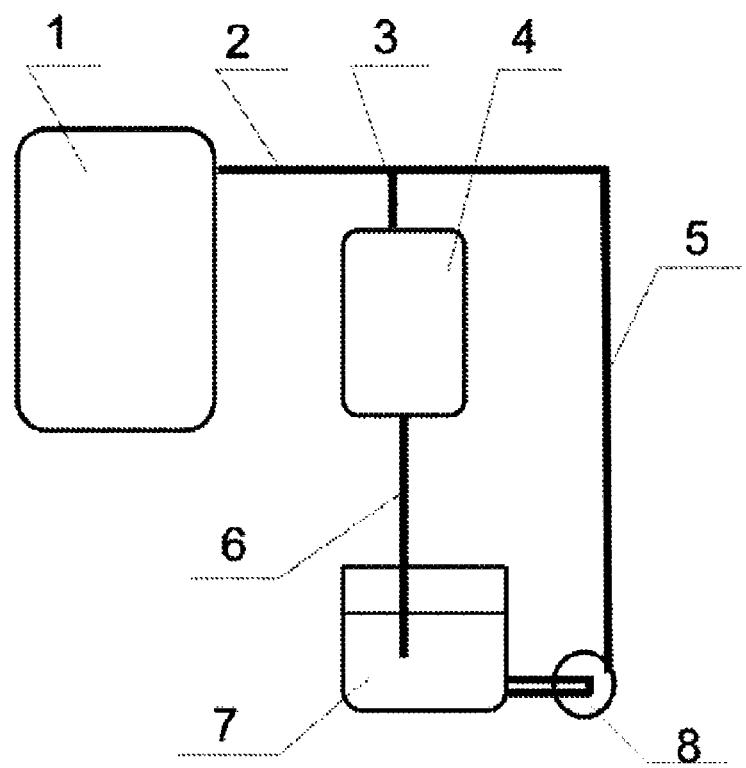
FIG. 2 is a schematic diagram of a device according to Embodiment 1 of the present invention.

As shown in FIG. 2, 1. vapor generator; 2. pipeline; 3. pipeline; 4. coffee powder container; 5. pipeline; 6. pipeline; 7. coffee beverage container (beverage cup); 8. pump.

To obtain a coffee beverage of low caffeine is mainly to extract as little caffeine in the coffee as possible but ensure a normal coffee taste. According to chemical and physical properties of the caffeine, segment extraction is adopted. A specific process is as follows.

Vapor is input into the coffee powder container 4 through the vapor generator 1, to sublimate coffee powder (the temperature is lower than 178° C.), extract a part of volatile components in the coffee powder, achieve the effect of wetting the coffee powder at the same time, and increase the temperature of the soaking solution to 67 to 85° C. (different caffeine contents) in advance. Mixed vapor is discharged from the pipeline 6 at a lower portion of a coffee chamber and enters the coffee beverage container 7. Water exists in the coffee beverage container 7. The mixed vapor is directly dissolved in the water, to form a solution containing the volatile components. Since the water temperature is low, the water vapor and the volatile components are directly dissolved and no gas is formed and discharged.

Then, warm water enters the coffee powder container 4 by using the pump 8 to soak the coffee powder for 20 seconds to 1 minute.

The soaked coffee solution is discharged into the coffee beverage container 7 through steam. Meanwhile, the coffee powder is sublimated once again, to extract remaining volatile fat components and heat the discharged coffee beverage at the same time. The work is stopped when the coffee beverage reaches below 85° C., and the whole making process is completed.

Principle: The caffeine is difficult to be dissolved when the coffee powder is sublimated since the vapor has a small water amount. The temperature of the vapor does not reach the sublimation temperature 178° C. of the caffeine, so the caffeine is difficult to be extracted during sublimation. During soaking, since the temperature is low, and the dissolving efficiency of the caffeine is low, the dissolving amount of the caffeine is small and the content of the caffeine in the made coffee beverage is low.

Through test, in a coffee beverage made at a temperature of 32° C., the content of the caffeine can be effectively reduced by 30% to 49% with the taste and appearance unchanged, thereby achieving a good effect.

Embodiment 2

Figure 3:
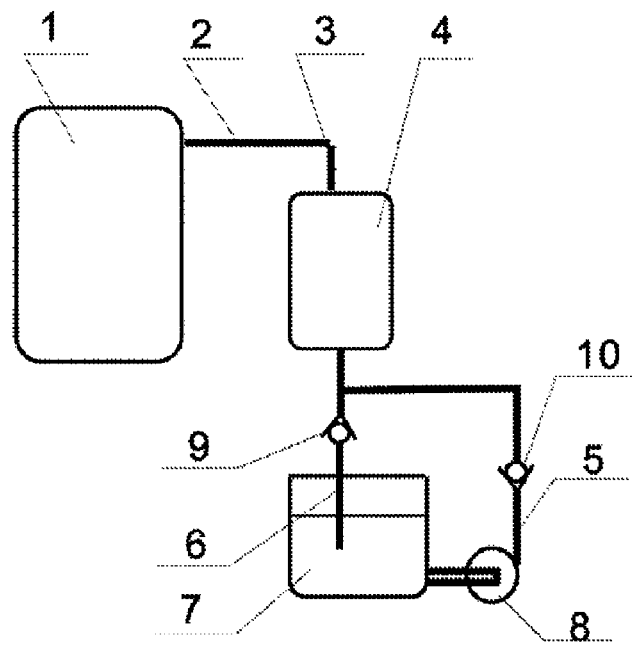
FIG. 3 is a schematic diagram of a device according to Embodiment 2 of the present invention.

The upper water inflow in Solution 1 is changed into lower water inflow, so as to increase a reverse impact of water on the coffee powder and improve a dissolving effect. As shown in FIG. 3, 1. vapor generator; 2. pipeline; 3. pipeline; 4. coffee powder container; 5. pipeline; 6. pipeline; 7. coffee beverage container; 8. pump; 9. first one-way valve; 10. second one-way valve.

It can be seen that, in this embodiment, two one-way valves 9 and 10 are added and the water inlet and the water outlet of the coffee powder container 4 are changed to be located in the lower portion. By controlling the operating direction of the pump 8, clear water is controlled to rise from the coffee beverage container 7 into the coffee powder container 4 or the made coffee beverage is controlled to be discharged from the coffee powder container 4 to the coffee beverage container 7. Since the one-way valves are used, the clear water and the coffee beverage flow through different pipelines respectively, without causing confusion.

Embodiment 3

Figure 4:
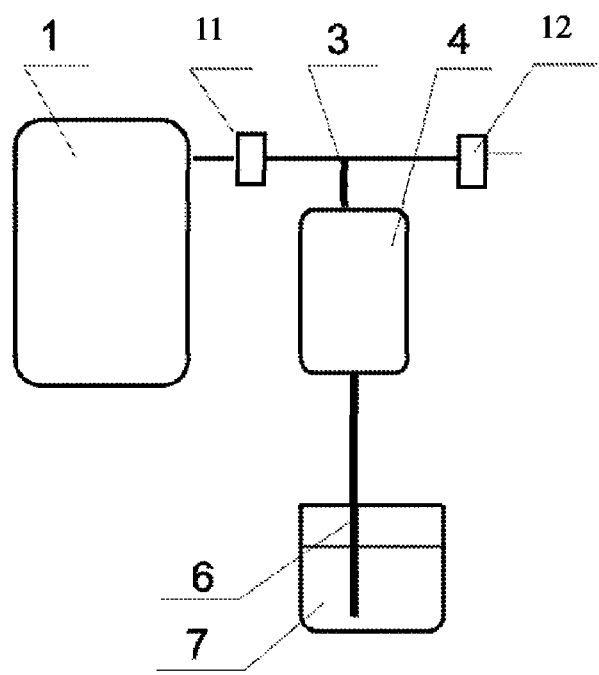
FIG. 4 is a schematic diagram of a device according to Embodiment 3 of the present invention.

As shown in FIG. 4, two electromagnetic valves are added in the upper portion, so that a negative pressure is generated in an extraction chamber to suck water from the lower portion back to the coffee powder container for dissolving, that is, reverse impact, thereby saving the pump and the one-way valve. In FIG. 4: 1. vapor generator; 11. first valve; 3. pipeline; 4. coffee powder container; 12. first valve; 6. pipeline; 7. coffee beverage container; 8. pump.

In this embodiment, the electromagnetic valves 11 and 12 are used to control on-off of vapor and an atmosphere, so as to input the vapor into the coffee powder container 4 when the sublimation is required and disable the coffee powder container 4 to communicate with the vapor generator 1 and the atmosphere. With the temperature decreased, a negative pressure is generated in the coffee powder container 4 to suck warm water into the coffee powder container 4. After the coffee is made, the coffee powder container 4 is enabled to communicate with the atmosphere, so as to discharge the coffee beverage into the coffee beverage container 7.

In sum, the taste (bitter, acid, astringency, and sweet) of the coffee mainly comes from water-soluble components, and the aroma comes from the volatile fat components, so the volatile components are obtained through the sublimation method, and the water-soluble components are obtained through the dissolving method. The volatile components are collected by a method of dissolving vapor in water, and the water-soluble components are dissolved in a solution containing the volatile components. Therefore, a cup of coffee beverage with the taste and aroma can be obtained. The caffeine is mainly extracted through dissolving at a high temperature, so the caffeine in the coffee is dissolved through soaking at a low temperature. In this way, according to the characteristics of the caffeine, the dissolving amount of the caffeine can be greatly reduced, thereby reducing the content of the caffeine in the coffee beverage. In the coffee beverage dissolved at a low temperature, enough volatile fat cannot be dissolved, so the aroma is insufficient. The volatile fat in the coffee powder is extracted through the sublimation method and melted in the coffee beverage, so as to improve the aroma of the coffee. The foregoing two extraction methods are combined differently, so as to obtain a cup of aromatic coffee beverage of low caffeine.

In this method, different combinations may be performed. For example, the sublimation may be performed first and then the dissolving is performed, or the dissolving may be performed first and then the sublimation is performed, or separate sublimation is performed and dissolving is performed intermediately.

Although the present invention is described above in further detail through specific embodiments, the present invention is not limited to the specific embodiments. It should be understood by persons of ordinary skill in the art that any simple deduction or replacement made without departing from the spirit of the present invention shall fall within the protection scope of the present invention.

What is claimed is:

1. A method for making a coffee beverage, comprising at least one sublimation process, at least one absorbing process, and at least one dissolving process, wherein in the sublimation process, coffee powder is heated by water vapor at a temperature lower than a sublimation temperature of caffeine to sublimate at least one part of substances in the coffee powder, so as to extract a part of volatile components in the coffee powder to form mixed vapor;

in the absorbing process, the mixed vapor is dissolved in water within a coffee beverage container, to form a solution containing the volatile components; and in the dissolving process, the coffee powder is soaked in water at a temperature lower than 85° C., to dissolve low-temperature water-soluble components in the coffee powder;

wherein the sublimation process is first performed, then the dissolving process is performed, then steam is used to discharge a soaked coffee solution into the coffee beverage container and sublimate the coffee powder once again so as to extract remaining volatile fat components, and heat the discharged coffee solution at a temperature between 67° C. and 85° C.

2. The method for making a coffee beverage according to claim 1, wherein in the sublimation process, the temperature is lower than 178° C.

3. The method for making a coffee beverage according to claim 1, wherein in the dissolving process, a soaking time is 10 seconds to 200 seconds and a soaking temperature is between 32° C. and 85° C.

4. The method for making a coffee beverage according to claim 1, wherein time for the sublimation process is controlled to be less than 300 seconds.

* * * * *